(12) United States Patent
Hetrick et al.

(10) Patent No.: US 7,418,550 B2
(45) Date of Patent: * Aug. 26, 2008

(54) METHODS AND STRUCTURE FOR IMPROVED IMPORT/EXPORT OF RAID LEVEL 6 VOLUMES

(75) Inventors: William A. Hetrick, Wichita, KS (US); Charles E. Nichols, Wichita, KS (US)

(73) Assignee: LSI Corporation, Milpitas, CA (US)

(*) Notice: Subject to any disclaimer, the term of this patent is extended or adjusted under 35 U.S.C. 154(b) by 88 days.

This patent is subject to a terminal disclaimer.

(21) Appl. No.: 11/311,523

(22) Filed: Dec. 19, 2005

(65) Prior Publication Data

US 2007/0028044 A1  Feb. 1, 2007

Related U.S. Application Data

(63) Continuation-in-part of application No. 11/192,544, filed on Jul. 30, 2005.

(51) Int. Cl.
*G06F 12/16* (2006.01)
(52) U.S. Cl. ..................... 711/114; 711/170
(58) Field of Classification Search ............. None
See application file for complete search history.

(56) References Cited

U.S. PATENT DOCUMENTS

| | | | |
|---|---|---|---|
| 6,275,898 B1 | 8/2001 | DeKoning | |
| 6,516,425 B1* | 2/2003 | Belhadj et al. | 714/6 |
| 6,530,004 B1* | 3/2003 | King et al. | 711/165 |
| 6,996,689 B2* | 2/2006 | Chatterjee et al. | 711/162 |
| 7,058,762 B2* | 6/2006 | Patterson et al. | 711/114 |
| 7,237,062 B2* | 6/2007 | Lubbers et al. | 711/114 |
| 2004/0210731 A1* | 10/2004 | Chatterjee et al. | 711/165 |
| 2004/0250017 A1* | 12/2004 | Patterson et al. | 711/114 |
| 2005/0086429 A1* | 4/2005 | Chatterjee et al. | 711/114 |
| 2005/0182992 A1* | 8/2005 | Land et al. | 714/701 |
| 2006/0015697 A1* | 1/2006 | Morishita et al. | 711/162 |
| 2006/0200626 A1* | 9/2006 | Gabryjelski | 711/114 |
| 2006/0288176 A1* | 12/2006 | Morishita et al. | 711/161 |
| 2007/0011401 A1* | 1/2007 | Zhang et al. | 711/114 |

* cited by examiner

*Primary Examiner*—Kevin Verbrugge
(74) *Attorney, Agent, or Firm*—Duft, Borsen & Fishman, LLP

(57) ABSTRACT

Methods and structure for improved import of RAID level 6 logical volumes into subsystems devoid of RAID level 6 hardware support. When a RAID level 6 logical volume is exported from a first storage subsystem and imported into a second storage subsystem devoid of RAID level 6 hardware support, features and aspects hereof first migrate the logical volume for use as a logical volume with a different RAID level supported by the second storage subsystem. The migration may be, for example, to a RAID level 5 logical volume performed by movement of data blocks to form new stripes and re-generation of associated parity blocks or by simpler re-mapping of existing blocks of the RAID level 6 volume to use only blocks and parity needed for RAID level 5 management. Further features and aspects allow migration to any other RAID management level supported by the second storage subsystem.

12 Claims, 11 Drawing Sheets

METHODS AND STRUCTURE FOR IMPROVED IMPORT/EXPORT OF RAID LEVEL 6 VOLUMES

RELATED APPLICATION

This patent application is a continuation in part of commonly owned, co-pending, patent application Ser. No. 11/192,544 filed 30 Jul. 2005 (hereinafter the "parent application") and claims priority thereto. This application is also related to commonly owned, co-pending patent application Ser. No. 11/305,992 filed herewith on 19 Dec. 2005 which is hereby incorporated by reference.

BACKGROUND OF THE INVENTION

1. Field of the Invention

The invention relates to import and export of RAID logical volumes and in particular relates to importation of a RAID level 6 volume into a subsystem that does not support RAID level 6 and re-importation of such a volume back to a RAID level 6 subsystem.

2. Discussion of Related Art

Storage subsystems have evolved along with associated computing subsystems to improve performance, capacity, and reliability. Redundant arrays of independent disks (so called "RAID" subsystems) provide improved performance by utilizing striping features and provide enhanced reliability by adding redundancy information. Performance is enhanced by utilization of so called "striping" features in which one host request for reading or writing is distributed over multiple simultaneously active disk drives to thereby spread or distribute the elapsed time waiting for completion over multiple, simultaneously operable disk drives. Redundancy is accomplished in RAID subsystems by adding redundancy information such that the loss/failure of a single disk drive of the plurality of disk drives on which the host data and redundancy information are written will not cause loss of data. Despite the loss of a single disk drive, no data will be lost though in some instances the logical volume will operate in a degraded performance mode.

RAID storage management techniques are known to those skilled in the art by a RAID management level number. The various RAID management techniques are generally referred to as "RAID levels" and have historically been identified by a level number. RAID level 5, for example, utilizes exclusive-OR ("XOR") parity generation and checking for such redundancy information. Whenever data is to be written to the storage subsystem, the data is "striped" or distributed over a plurality of simultaneously operable disk drives. In addition, XOR parity data (redundancy information) is generated and recorded in conjunction with the host system supplied data. In like manner, as data is read from the disk drives, striped information may be read from multiple, simultaneously operable disk drives to thereby reduce the elapsed time overhead required completing a given read request. Still further, if a single drive of the multiple independent disk drives fails, the redundancy information is utilized to continue operation of the associated logical volume containing the failed disk drive. Read operations may be completed by using remaining operable disk drives of the logical volume and computing the exclusive-OR of all blocks of a stripe that remain available to thereby re-generate the missing or lost information from the inoperable disk drive. Such RAID level 5 storage management techniques for striping and XOR parity generation and checking are well known to those of ordinary skill in the art.

RAID level 6 builds upon the structure of RAID level 5 but adds a second block of redundancy information to each stripe. The additional redundancy information is based exclusively on the data block portions of a given stripe and does not include the parity block computed in accordance with typical RAID level 5 storage management. Thus, the additional redundancy block for each stripe produces redundancy information orthogonal to the parity data redundancy information used in RAID level 5. Typically, the additional redundancy block generated and checked in RAID level 6 storage management techniques is orthogonal to the parity generated and checked in accordance with RAID level 5 standards.

In modern storage subsystems, disk drives are often integrated within an enclosure or box with little to no processing capabilities associated therewith. Such a box is often referred to as "just a box of disks" or "JBOD". Whether configured as such a box or as individual disk drives devoid of such a common enclosure, it is common for large computing enterprises to move individual disk drives or multiple disk drives from one storage subsystem to another storage subsystem. Such movement may be for purposes of load balancing, security or other reasons unique to the computing enterprise. Such physical movement of disk drives or modules or boxes of disk drives is referred to herein as "drive migration" or "physical migration" and refers to the physical act of removing a disk drive or multiple disk drives from one storage subsystem and inserting them into another storage subsystem.

It is common in such storage subsystems to logically define one or more logical volumes such that each logical volume comprises some portion of the entire capacity of the storage subsystem. Each volume may be defined to span a portion of each of one or more disk drives in the storage subsystem. Multiple such logical volumes may be defined within the storage subsystem typically under the control of a storage subsystem controller. Therefore, for any group of disk drives comprising one or more disk drives, one or more logical volumes or portions thereof may physically reside on the particular subset of disk drives. It is common for a storage subsystem controller component (i.e., a RAID storage controller) to record configuration information about the known logical volumes on each disk drive in the storage subsystem. The configuration information ("configuration database") records maintain information regarding which disk drives are used to form a portion of each logical volume. The storage controller updates such configuration information from time to time (i.e., as the configuration is changed) and may associate a version number, time stamp, or other indicia to indicate the validity of the configuration database.

Typically, before a subset of disk drives is physically migrated from a first storage subsystem to a second storage subsystem, all logical volumes associated with the disk drive to be migrated are disabled or otherwise made inaccessible to users of the first storage subsystem from which the disk drive are to be migrated. When a second storage subsystem first senses a new disk drive being inserted into its control, the configuration information contained on the inserted disk drive is read by the second storage subsystem (i.e., the destination of the disk drive migration) and logical volumes defined in that configuration database are merged with the definitions of logical volumes already known to the receiving second storage subsystem. When all disk drives required for any particular logical volume newly defined to the receiving second storage subsystem are finally inserted, that logical volume may be made available to users of the second storage subsystem. Often an administrative user may be asked whether he/she desires the newly defined logical volume to be "imported" into the new receiving storage subsystem to thereby make it available for use in the receiving second storage subsystem.

A problem may arise where a RAID level 6 logical volume is exported from the first storage subsystem and imported to a second storage subsystem that does not adequately support RAID level 6 storage management techniques. Most present-day storage subsystems utilize hardware assist circuitry to maintain desired performance levels for any given RAID storage management level. In other words, a first storage subsystem may include hardware assist circuitry for improving the performance of both RAID levels 5 and 6 while the second storage subsystem (e.g., an older "legacy" subsystem) may include hardware support only capable of adequately performing RAID level 5 storage management techniques. In addition, older legacy systems may provide efficient RAID assist circuitry support only for other RAID levels such as level 1 (mirroring) or even level 0 (striping without redundancy information added).

To resolve the problem of a RAID level 6 logical volume being received for import within a storage subsystem supporting only RAID level 5 or other RAID levels, three generic options have generally been proposed in the past. First, though the logical volume is recognized by the receiving storage subsystem, the storage controller therein may disallow a user from importing the newly defined logical volume into its control. The newly defined logical volume will simply remain unavailable to the second, receiving storage subsystem. A second prior solution involves allowing the importation of the newly discovered RAID level 6 volume but indicating that the volume is incompatible with capabilities of the receiving, second storage subsystem. In these first two options, integrity of the information stored in the newly discovered logical volume is maintained in that no user may be allowed access to the RAID level 6 logical volume.

A third general approach known in the art is to permit importation of the newly defined logical volume and to emulate the RAID level 6 storage management techniques utilizing software features rather than hardware assist circuits that may have been available to the exporting first storage subsystem. In general, this third approach of emulating RAID level 6 management utilizing software techniques within the second subsystem's storage controller provides prohibitively poor performance.

The parent application teaches another approach wherein the mapping of blocks of the RAID level 6 volume may be re-mapped so as to essentially ignore the additional redundancy information blocks of RAID level 6 and use only the blocks pertinent to RAID level 5 management without requiring movement of any blocks. This approach reduces the time required to make the imported volume available on the storage system that imports the volume. However, operation of the volume re-mapped as a RAID level 5 volume may be suboptimal in that the blocks are not as easily located on the volume as compared to a standard mapping of a RAID level 5 volume.

It is evident from the above discussion that a need exists for improved methods and systems for improved importation and exportation between RAID level 6 and RAID level 5 storage subsystems.

SUMMARY OF THE INVENTION

The present invention solves the above and other problems, thereby advancing the state of the useful arts, by providing methods and associated systems to permit importation of a RAID level 6 logical volume into a storage subsystem adapted with hardware assist circuits to adequately support RAID level 5 but not to adequately support RAID level 6. More specifically, features and aspects hereof provide that the volume to be imported is first migrated from a RAID level 6 volume to a RAID level 5 volume re-mapped to migrate blocks for optimal RAID level 5 performance. Other aspects hereof permit an administrative user to define a new RAID level to which the imported volume is to be migrated prior to making the imported volume available for use in a storage system not optimized for RAID level 6 storage management techniques.

Where the parent patent application generally teaches that the mapping of the volume is logically changed so that the additional redundancy blocks used in RAID level 6 management techniques are simply ignored and no blocks need be moved nor parity re-computed, this solution is directed to physically migrating blocks of the volume as a pre-requisite to completed importation. The blocks are migrated so that the volume is optimally mapped for RAID level 5 operation. If the volume is later exported out of the RAID level 5 oriented storage system into a RAID level 6 capable system, the volume may be promoted to RAID level 6 management in accordance with well known techniques. Other aspects hereof provide that the volume may be migrated to other RAID levels as a pre-requisite to importation.

One feature hereof provides a method associated with RAID storage subsystems including a first subsystem that includes hardware support for RAID level 6 storage management and including a second subsystem that does not include hardware support for RAID level 6 storage management, the method comprising: migrating an imported RAID level 6 logical volume to another RAID management level for use in the second subsystem; operating the migrated logical volume in the second subsystem as a RAID logical volume other than RAID level 6; and flagging the migrated logical volume to indicate that the migrated logical volume has been migrated from a RAID level 6 logical volume to another RAID level supported by hardware of the second subsystem.

Another aspect hereof further provides that the step of migrating further comprises migrating the RAID level 6 logical volume to a RAID level 5 logical volume.

Another aspect hereof further provides that the step of migrating the RAID level 6 logical volume to a RAID level 5 logical volume further comprises: moving blocks of data to form new RAID level 5 stripes on the disk drives of the logical volume; and regenerating parity blocks for each new RAID level 5 stripe so formed by the step of moving.

Another aspect hereof further provides that the step of migrating the RAID level 6 logical volume to a RAID level 5 logical volume further comprises re-mapping the RAID level 6 to use the data blocks and first redundancy block of each RAID level 6 stripe of the RAID level 6 logical volume as a RAID 5 stripe to thus form the RAID level 5 logical volume.

Another aspect hereof further provides for using RAID level 6 redundancy information during the step of migrating to recover from errors encountered during the step of migrating.

Another feature hereof provides a system comprising: a first storage subsystem having hardware support for RAID level 6 management of a logical volume wherein the first storage system includes a plurality of disk drives on which a RAID level 6 logical volume is configured wherein the first storage subsystem is adapted to export the RAID level 6 logical volume; a second storage subsystem devoid of circuits to support RAID level 6 management and adapted to import the RAID level 6 logical volume; and migration apparatus associated with either or both of the first and second storage subsystems for migrating the RAID level 6 logical volume to a different RAID management level supported by the second storage subsystem.

Another aspect hereof further provides that the migration apparatus is integral with the first storage system and adapted to migrate the RAID level 6 logical volume following exportation of the RAID level 6 logical volume.

Another aspect hereof further provides that the migration apparatus is integral with the second storage system and adapted to migrate the RAID level 6 logical volume in advance of importation of the RAID level 6 logical volume.

Another aspect hereof further provides that the migration apparatus is adapted to migrate the RAID level 6 logical volume to a RAID level 5 logical volume.

Another aspect hereof further provides that the migration apparatus is further adapted to relocate data blocks of stripes of the RAID level 6 logical volume to form new stripes that comprise the RAID level 5 logical volume and to generate corresponding parity blocks for the new stripes.

Another aspect hereof further provides that the migration apparatus is further adapted to re-map data blocks and a corresponding parity block of each stripe of the RAID level 6 logical volume to form corresponding new stripes of a RAID level 5 logical volume.

Another feature provides a method operable in a system including a first storage subsystem and a second storage subsystem. The method operable for exporting and importing a RAID logical volume between the first and second storage subsystems, the method comprising: exporting a RAID level 6 logical volume from the first storage subsystem; migrating the RAID level 6 logical volume into a RAID level 5 logical volume; and importing the RAID level 5 logical volume into the second storage subsystem.

Another aspect hereof further provides that the step of migrating is performed within the first storage subsystem in response to the step of exporting.

Another aspect hereof further provides that the step of migrating is performed within the second storage subsystem in advance of the step of importing.

Another aspect hereof further provides that the step of migrating further comprises: relocating data blocks of stripes of the RAID level 6 logical volume to form new stripes that comprise the RAID level 5 logical volume and to generate corresponding parity blocks for the new stripes.

Another aspect hereof further provides that the step of migrating further comprises: re-mapping data blocks and a corresponding parity block of each stripe of the RAID level 6 logical volume to form corresponding new stripes of a RAID level 5 logical volume.

DETAILED DESCRIPTION OF THE DRAWINGS

Figure 1:
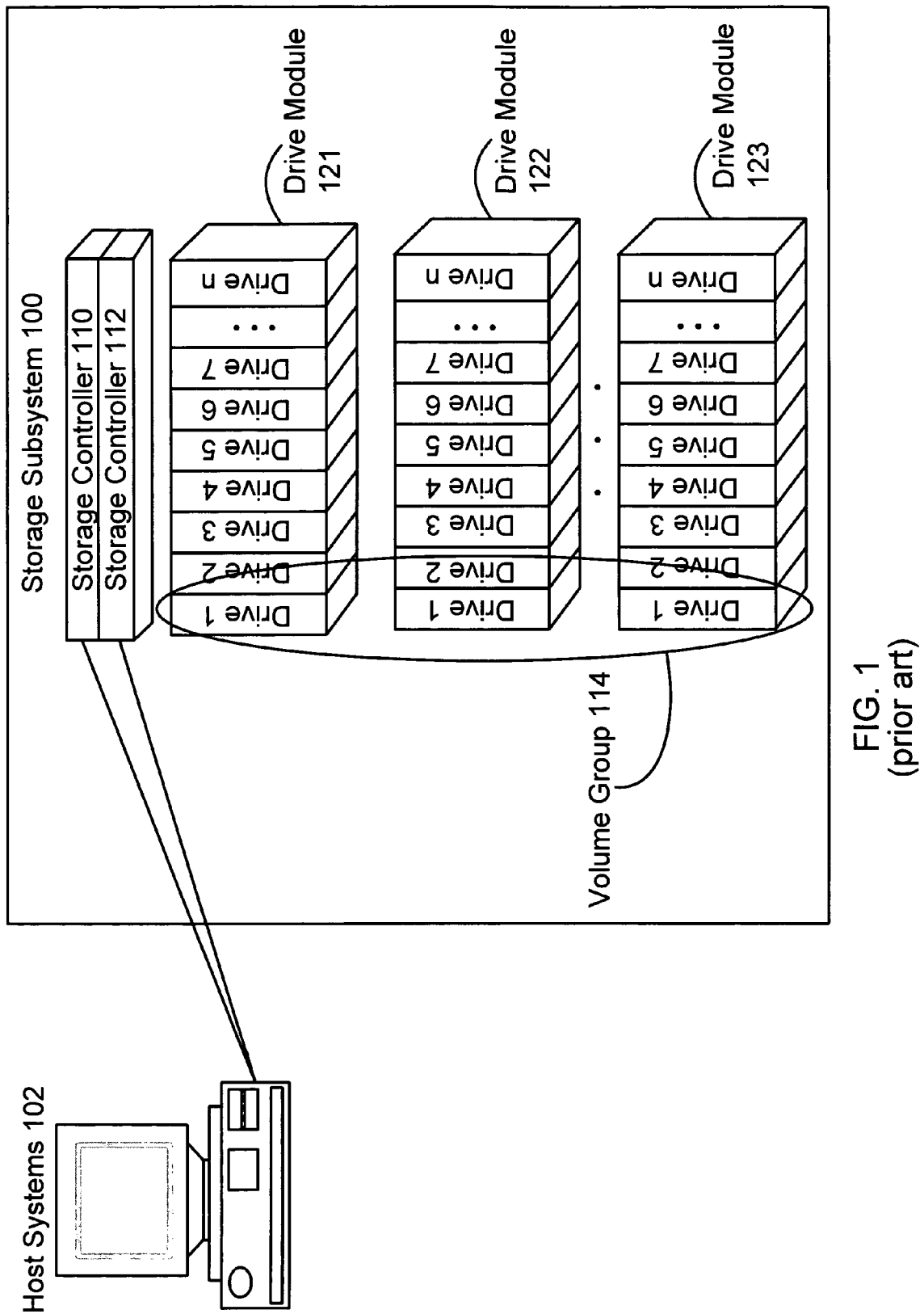
FIG. 1 is a block diagram of a typical storage subsystem as generally known in the art.

FIG. 1 is a block diagram of a storage subsystem 100 coupled to a host system 102 for processing I/O requests. As generally known in the art, such a storage subsystem 100 may include one or more storage controllers 110 and 112 each coupled to the one or more host systems 102. Further, a plurality of disk drives, organized as individual disk drives or as modules of disk drives, may be provided within such a storage subsystem. As shown in FIG. 1, drive module 121 may include drives 1 through n, drive module 122 may also include its own drives also identified therein as drives 1 through n and drive module 123 may also include its own drives 1 through n. A volume group 114 may comprise portions of one or more disk drives of one or more drive modules. The volume group 114 may therefore include portions of one or more logical volumes.

As is generally known in the art, any number of such drive modules, each including any number of disk drives, may be provided in such a storage subsystem 100. Further, as generally known in the art, each drive module 112 may comprise individual disk drives or may be disk drives incorporated within a common enclosure supplying power, cooling, and interface features. Storage controllers 110 and 112 are generally coupled to the drive modules 121 through 123 (and hence to the individual disk drives) by any of several well-known interconnection protocols and media including, for example, high speed serial attachment, fiber optic serial attachment, parallel bus attachment (such as parallel SCSI), etc. Further, those of ordinary skill in the art will recognize that any number of such volume groups 114 may be defined within a storage subsystem 100 and may comprise any portion of any of the disk drives of any of the drive modules. Logical configuration and mapping features to define such volume groups are well known to those of ordinary skill in the art.

Figure 2:
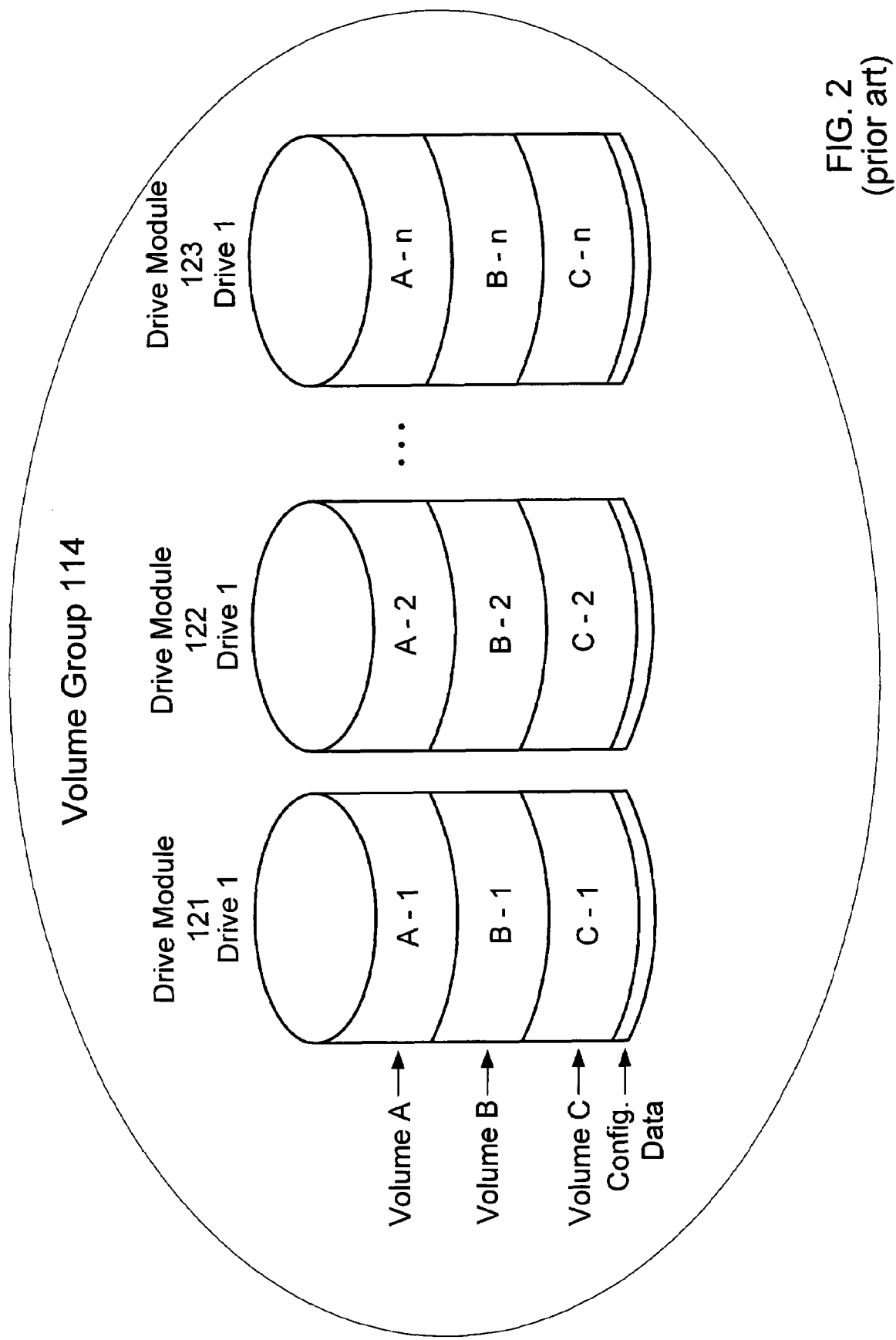
FIG. 2 shows additional details of a volume group of FIG. 1 as generally known in the art.

FIG. 2 is a block diagram providing additional details of an exemplary volume group 114 shown in FIG. 1. As noted above, volume group 114 may comprise any portion of any disk drives of any of the drive modules. For example, as shown in FIG. 2, exemplary volume group 114 comprises a portion (the entirety) of disk drives 1 in each of drive modules 121, 122, and 123. Those of ordinary skill in the art will readily recognize that any number of disk drives or even portions of disk drives may be included within such a volume group 114. Further, those of ordinary skill in the art will readily recognize that any number of drive modules may form a part of a defined volume group 114.

As shown, a volume group 114 comprising any number of disk drives or portions thereof distributed over any number of drive modules may comprise plurality one or more logical volumes shown in FIG. 2 as volumes A, B, and C. In particular, as shown in FIG. 2, volume A of volume group 114 comprises portions of three disk drives as indicated. Specifically, logical volume A comprises a portion of drive 1 of drive module 121, a portion of drive 1 of drive module 122, and a portion of drive 1 of drive model 123. In like manner, volume B comprises corresponding portions of drive 1 of each of drive modules 121 through 123. Volume C likewise comprises portions of each of disk drive 1 of each of the drive modules 121 through 123.

As further noted above, it is common for storage controllers in such a storage subsystem to create a configuration database (e.g., "configuration data" or "configuration information") and to write the configuration database on a reserved portion of each disk drive of each drive module. Thus, the configuration of logical volumes A, B, and C will be readily a available to any storage subsystem that first senses importation or insertion of a disk drive from a logical volume in a corresponding volume group 114.

When volume group 114 is migrated from the first storage subsystem to a second storage subsystem, the second storage subsystem may obtain information about the configuration of each of logical volumes A, B, and C from the configuration database provided on any of the disk drives associated with the volume group.

Figure 3:
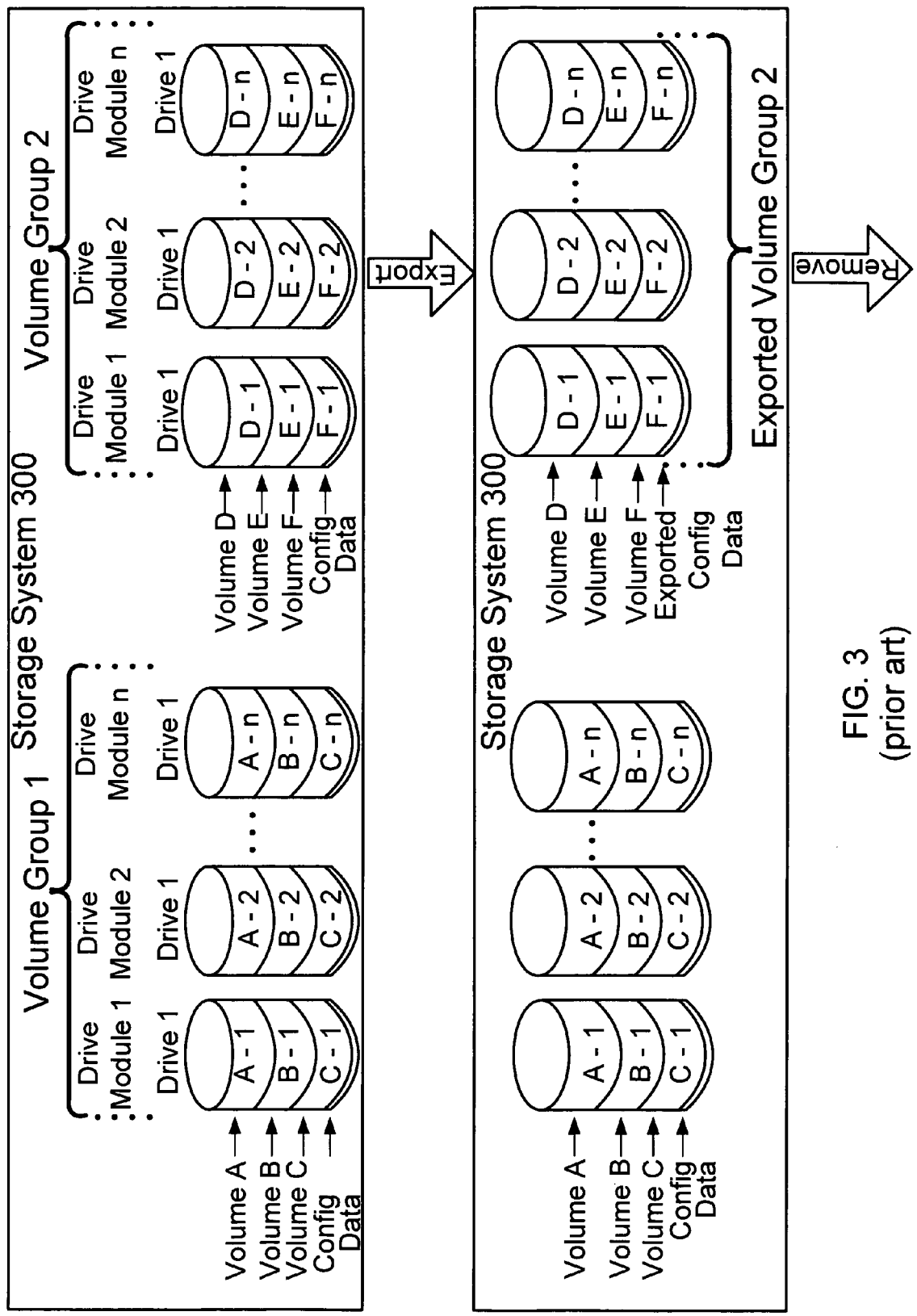
FIG. 3 is a diagram describing exportation to migrate a logical volume from a storage subsystem as generally known in the art.

FIG. 3 shows an exemplary process of preparing a volume group in a storage subsystem for exportation from a first system to migrate to another storage subsystem. In FIG. 3, storage subsystem 300 is shown atop FIG. 3 in a state before exportation of an identified volume group and at the bottom of FIG. 3 after exporting the identified volume group. As shown in FIG. 3 storage subsystem 300 includes six logical volumes (volume A through volume F). In accordance with the needs of the particular application, volume group 2 of storage subsystem 300 has been selected by the administrative user to be prepared for exportation and removal from the storage subsystem 300. Configuration data on each of the identified drive modules associated with the volume group to is therefore updated to indicate that the logical volume has been made unavailable (e.g., volume group 2 having been selected for exportation will be reconfigured by adjusting the configuration data to indicate that the volume group 2 is now exported and ready for removal). Once so prepared for exportation, volume group 2 may be physically removed from storage subsystem 300 to be inserted in another storage subsystem.

Figure 4:
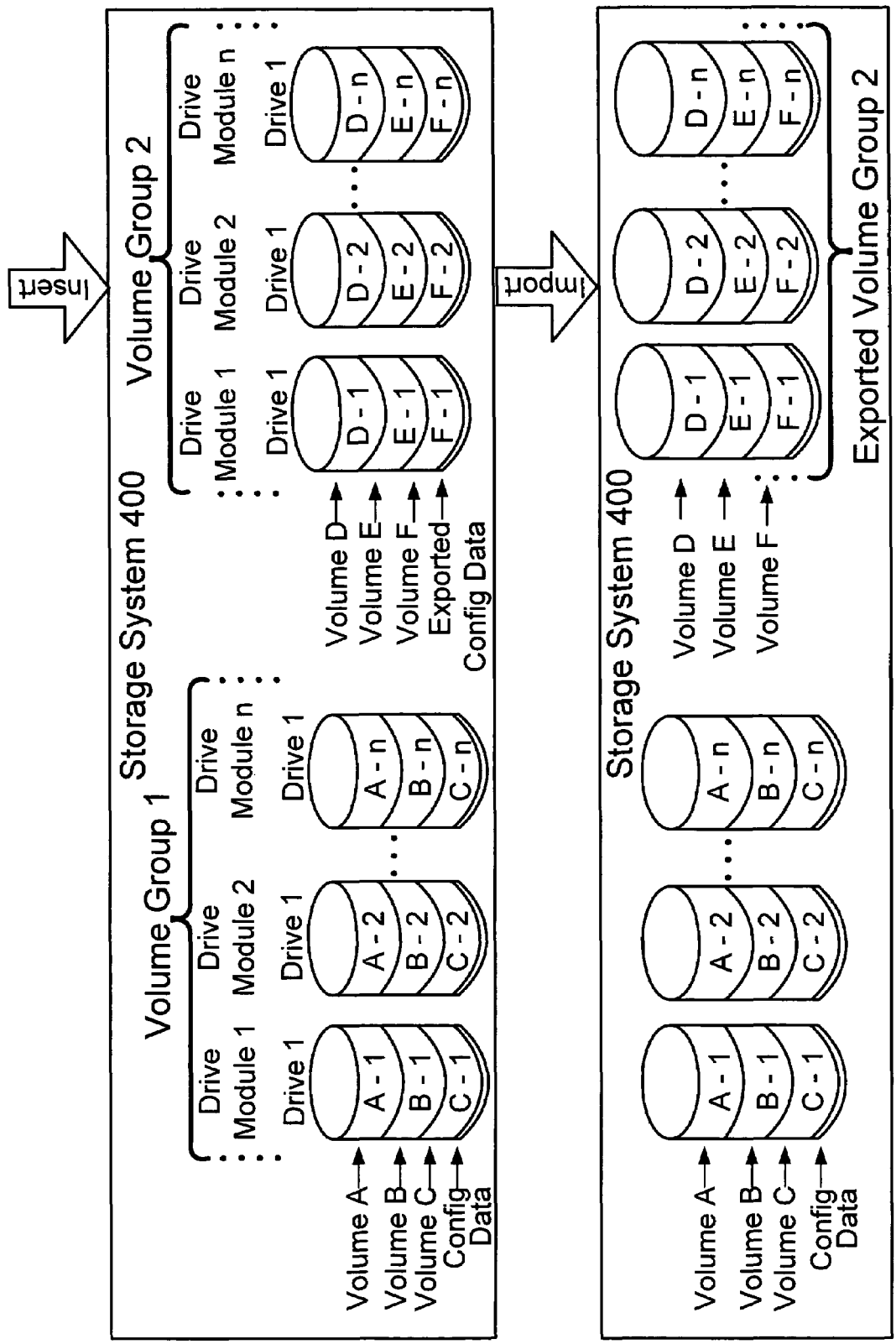
FIG. 4 is a diagram describing importation to migrate a logical volume to a storage subsystem as generally known in the art.

FIG. 4 shows a related block diagram where a previously exported and removed volume group may be imported into a second storage subsystem 400. As shown in FIG. 4, volume group 2 is detected as newly inserted in the storage subsystem 400. Upon sensing the insertion of at least one disk drive of volume group 2, the exported configuration data may be inspected to determine whether any logical volumes on the inserted volume group may be utilized in this second storage subsystem 400.

As noted above, prior art techniques allow importation of a RAID logical volume utilizing the same level of RAID storage management. However, as noted above, it has been an ongoing problem to allow importation of a RAID level 6 logical volume into a storage subsystem that does not effectively support RAID level 5. As noted above, RAID level 6 provides similar functionality to that of RAID level 5 storage management but adds orthogonal, additional redundancy information to further enhance reliability of the storage subsystem.

Figure 5:
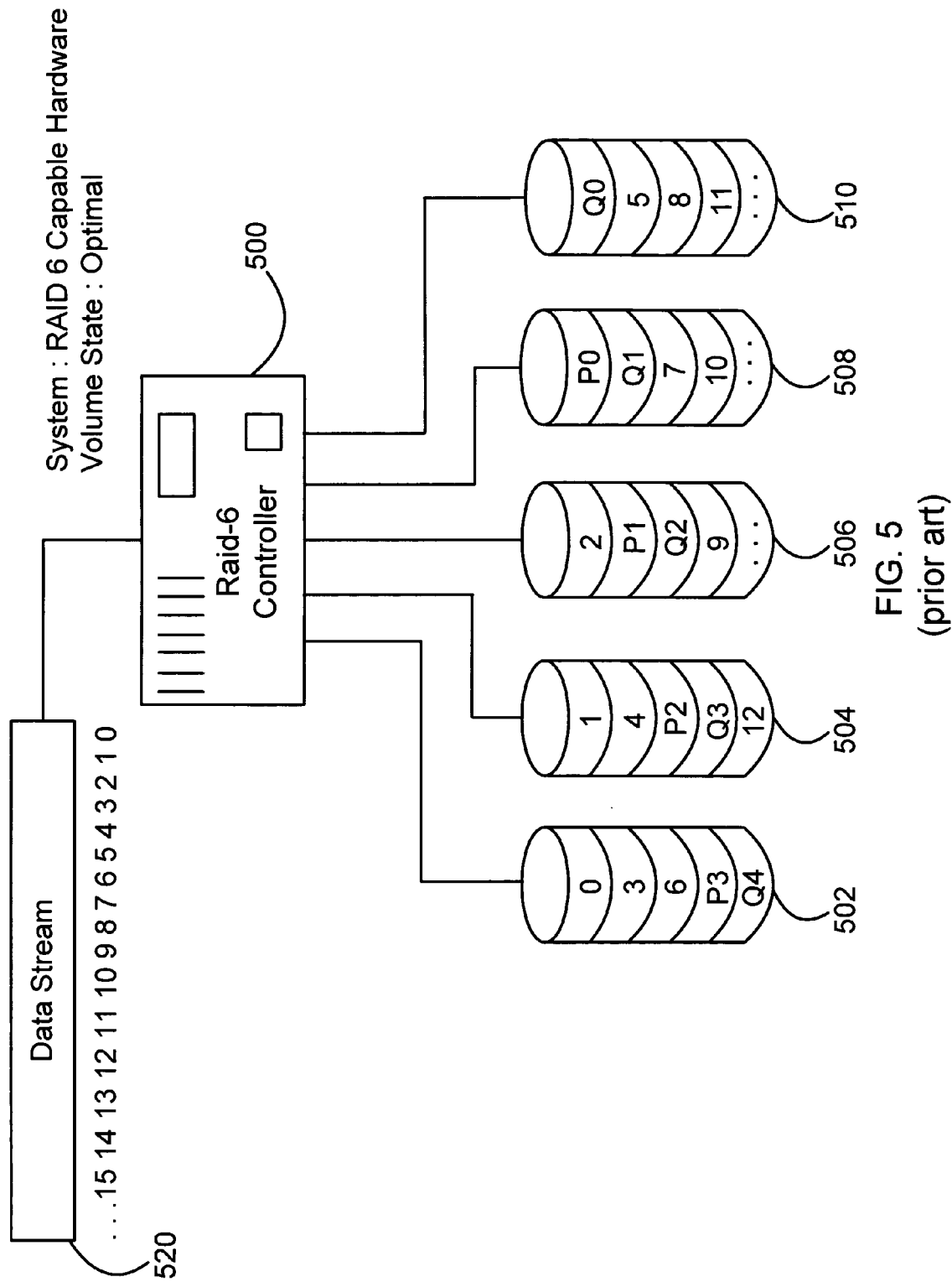
FIG. 5 is a diagram describing typical mapping of blocks in a RAID level 6 storage subsystem as generally known in the art.

FIG. 5 shows a typical data stream 520 comprising a plurality of logical blocks represented by logical block numbers 0 through 15, etc. RAID level 6 ("RAID-6") storage controller 500 receives the logical blocks to be written to the disk drives as a sequence of logical blocks numbered zero through fifteen. The storage controller 500 adapted for processing RAID-6 storage management then distributes or stripes the various blocks over the plurality of simultaneously operable disk drives 502 through 510. Each stripe comprises a plurality of logical blocks plus an associated parity block and an associated additional redundancy information block in accordance with RAID-6 storage management standards. For example, a first stripe shown in FIG. 5 comprises logical block 0 on disk drive 502, logical block 1 on disk drive 504, logical block 2 on disk drive 506, parity block P0 on disk drive 508, and additional redundancy block Q0 on disk drive 510. In like manner a second stripe comprises logical blocks 3, 4, and 5 on disk drives 502, 504, and 510, respectively plus redundancy blocks P1 and Q1 on disk drives 506 and 508, respectively. A third stripe comprises logical blocks 6, 7, and 8 and redundancy information blocks P2 and Q2 on disk drives 502, 508, 510, 504, and 506, respectively. In similar manner, a fourth and fifth stripe are depicted in FIG. 5 as distributed over the disk drives. Those of ordinary skill in the art will readily recognize the typical mapping of logical blocks to multiple disk drives in a striped, RAID-6 logical volume configuration.

Figure 6:
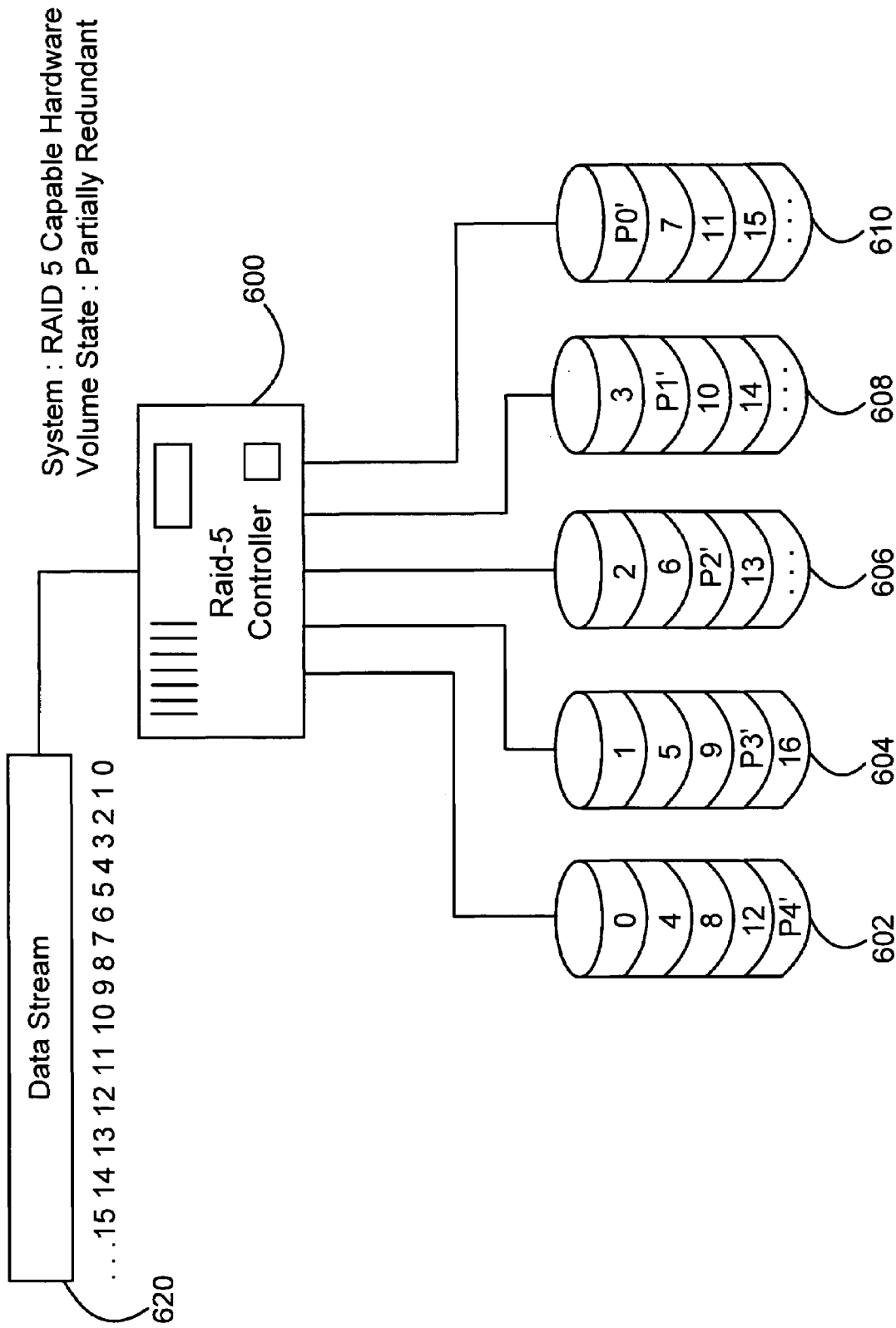
FIG. 6 is a diagram depicting an exemplary migration of a RAID level 6 logical volume for use in a RAID level 5 storage subsystem in accordance with features and aspects hereof.

FIG. 6 is a block diagram showing storage controller 600 adapted for effective RAID level 5 ("RAID-5") storage management but not capable of effectively performing RAID-6 storage management. For example, storage controller 600 may be devoid of hardware assist circuits for computing the additional redundancy information required by RAID-6 storage management. However, the storage controller 600 may be fully capable of adequately performing RAID-5 storage management.

A storage volume comprising portions of disk drives 602 through 610 is shown as imported from a RAID level 6 capable storage system as discussed above with respect to FIG. 5. To optimally operate the imported volume, the volume has been migrated to RAID level 5 mapping of he blocks prior to importation in accordance with features and aspects hereof. Once so migrated then imported, the imported volume may be operated optimally by controller 600 as a standard RAID level 5 storage volume.

Storage controller 600 receives a data stream comprising a sequence of logical blocks supplied by a host system. The blocks may be identified by a logical block address or number indicated as block numbers zero through fifteen. Storage controller 600 then distributes or stripes the supplied information over the plurality of disk drives 602 through 610. In particular in accordance with features and aspects hereof, storage controller 600 is adapted to map the logical blocks associated with disk drives 602 through 610 such that the logical volume may be managed as a standard RAID-5 logical volume rather than a RAID-6 logical volume as it was originally configured. As noted, the blocks of the imported volume are re-mapped and migrated to new locations on drives 602 through 610 so that the imported volume may be optimally managed as a standard RAID level 5 volume.

More specifically, the logical blocks and associated RAID-5 parity blocks are moved (migrated) and mapped to the standard locations as depicted for a standard RAID-5 storage management technique. Additional redundancy information blocks associated only with RAID-6 storage management of the logical volume are over-written by data or parity blocks required for RAID level 5 storage management techniques. In the depicted 5 drive configuration, each stripe is adjusted by moving (migrating) data blocks such that each stripe now comprises 4 data blocks and a corresponding parity block. Since data blocks are migrated (moved) to new stripe locations, the parity blocks are re-computed and written to the disk drives as P0" through P4".

A first stripe shown in FIG. 6 therefore comprises logical blocks 0, 1, 2, and 3 on disk drives 602, 604, 606, and 608, respectively and newly computed parity block P0' on disk drive 608 over writing what was previously the additional redundancy block (Q0 of FIG. 5) used only for RAID level 6 storage management techniques. In like manner, a second stripe includes data blocks 4, 5, 6, and 7 on disks 602, 604, 606, and 610, respectively and newly computed parity block P1' on disk drive 608. Second redundancy block Q1 of FIG. 5 on disk 608 is over-written by the newly computed parity block P1'. In a third stripe comprising data blocks 8 through 11, newly computed parity block P2' on disk 606 over-writes the second redundancy block Q2 of FIG. 5 used only for RAID level 6 storage management techniques. In a fourth stripe comprising data blocks 12 through 15, newly computed parity block P3' on disk 604 over-writes the second redundancy block Q3 of FIG. 5 used only for RAID level 6 storage management techniques. In a fifth stripe comprising data blocks 16 through 19, newly computed parity block P4' on disk 602 over-writes the second redundancy block Q4 of FIG. 5 used only for RAID level 6 storage management techniques. In like manner, subsequent stripes are formed by migrating data blocks, re-computing an associated parity block in accordance with RAID level 5 management techniques, and the re-computed parity block over-writes the previous location of a second parity block used in the RAID level 6 storage management of the volume prior to migration and importation.

Figure 11:
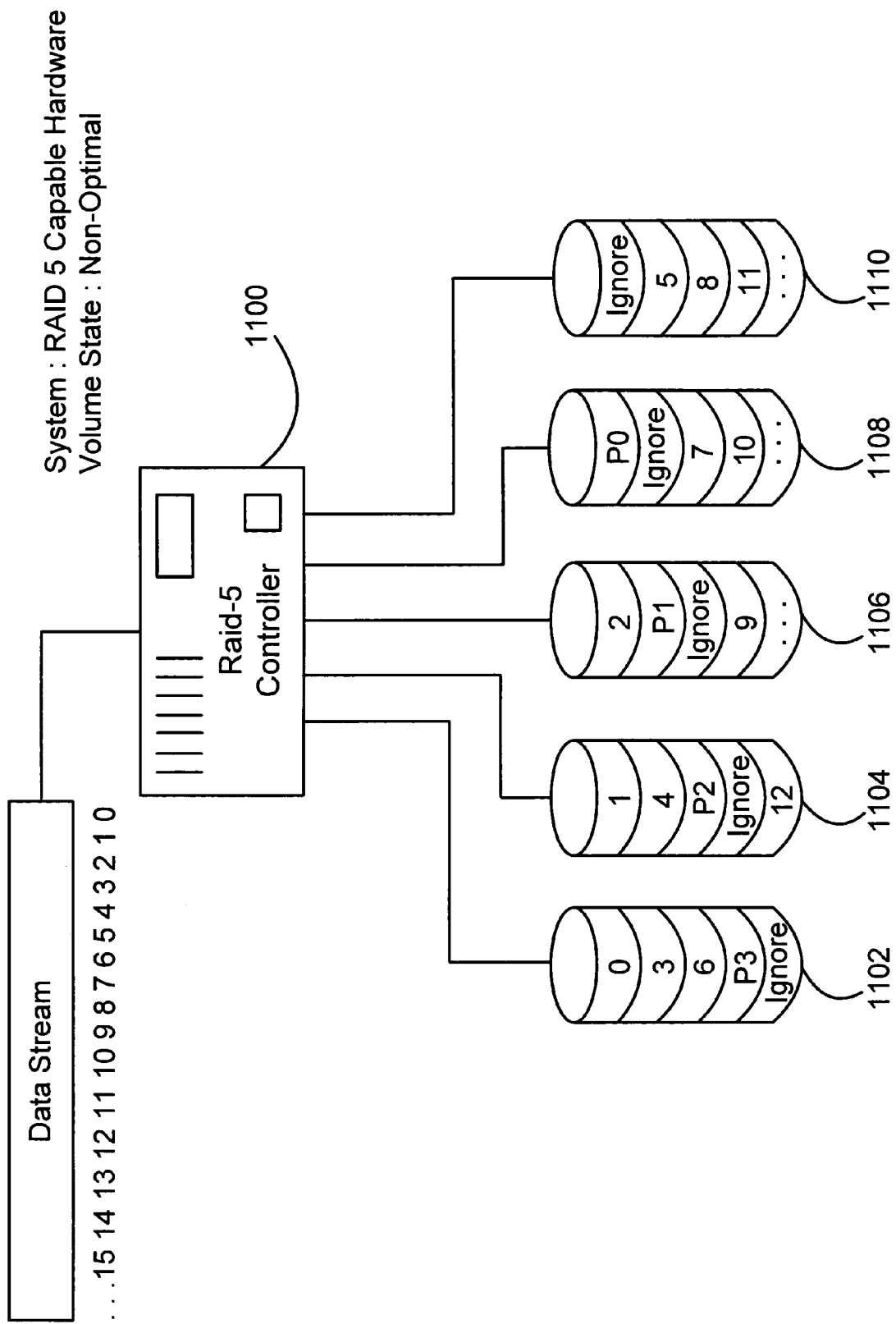
FIG. 11 is a diagram depicting an exemplary migration of a RAID level 6 logical volume for use in a RAID level 5 storage subsystem in accordance with features and aspects hereof.

By so migrating and re-mapping the RAID-6 logical volume into a corresponding standard RAID-5 logical volume, the logical volume may be optimally utilized in the storage subsystem having a RAID-5 storage controller 600 though the storage controller does not effectively support RAID-6 storage management. Those of ordinary skill in the art will recognize that controller 600 may be configured for RAID-5 or other RAID and non-RAID storage management techniques but not well adapted for RAID-6 storage management. Thus, the migration of blocks from RAID level 6 to a new RAID level may include migration to RAID level 5 as shown in FIG. 6 or to other RAID and non-RAID storage management formats. FIG. 6 is therefore intended merely as exemplary of one possible storage system enhanced in accordance with features and aspects hereof FIG. 11 is a block diagram depicting another migration of a RAID level 6 volume into a RAID level 5 logical volume by re-mapping the data blocks and associated parity blocks. The parent application teaches methods and structure for migrating a logical volume by re-mapping the blocks to eliminate the need for movement of data blocks and remaining, associated redundancy information. RAID level 6 includes data blocks in each stripe with an associated parity block generated in accordance with RAID level 5 storage management. In accordance with the teachings of the parent application and with features and aspects hereof, the additional redundancy block generated in accordance with RAID level 6 storage management may be ignored in each stripe such that the stripe may be managed as a RAID level 5 stripe. The logical volume so migrated by re-mapping the blocks allows the volume to be used in a RAID level 5 storage subsystem without the need for moving any data blocks and without need to re-compute associated RAID level 5 parity blocks for each stripe. Though the re-mapped logical volume may not be optimally accessed in this re-mapped configuration, it may none the less be usable within a RAID level 5 storage management subsystem that is devoid of hardware assist circuits to support RAID level 6 storage management.

As in FIG. 6, RAID level 5 storage subsystem controller 1100 is coupled to the disk drives 1102 through 1110 of a volume to be imported. Data blocks 0 . . . 15 and associated parity blocks P0 . . . P3 are distributed over disks 1102 . . . 1110 as they are in a RAID level 6 logical volume as shown in FIG. 5. However, the additional redundancy blocks Q0 . . . Q3 of the RAID level 6 logical volume format in FIG. 5 are ignored in the re-mapped configuration of FIG. 11. Thus each stripe comprises the same data blocks and RAID level 5 parity block as was present in the stripe in a RAID level 6 configuration. No movement of data blocks or parity blocks is necessary nor is there a need to re-compute the RAID level 5 parity blocks.

Still further, those of ordinary skill in the art will recognize a number of other modes of migration of a RAID level 6 logical volume into a different RAID storage management level for importation into a storage subsystem devoid of RAID level 6 assist circuitry. For example, the RAID level 6 logical volume may be mapped to a RAID level 0 logical volume in which data blocks are striped over the disk drives but no redundancy information is provided. In such a re-mapping, as for a re-mapping to RAID level 5, the data blocks may be moved to generate new stripes of the data blocks may be left in place and the redundancy information simply ignored to permit a storage subsystem to use the imported logical volume without the need for RAID level 6 assist circuitry.

Figure 7:
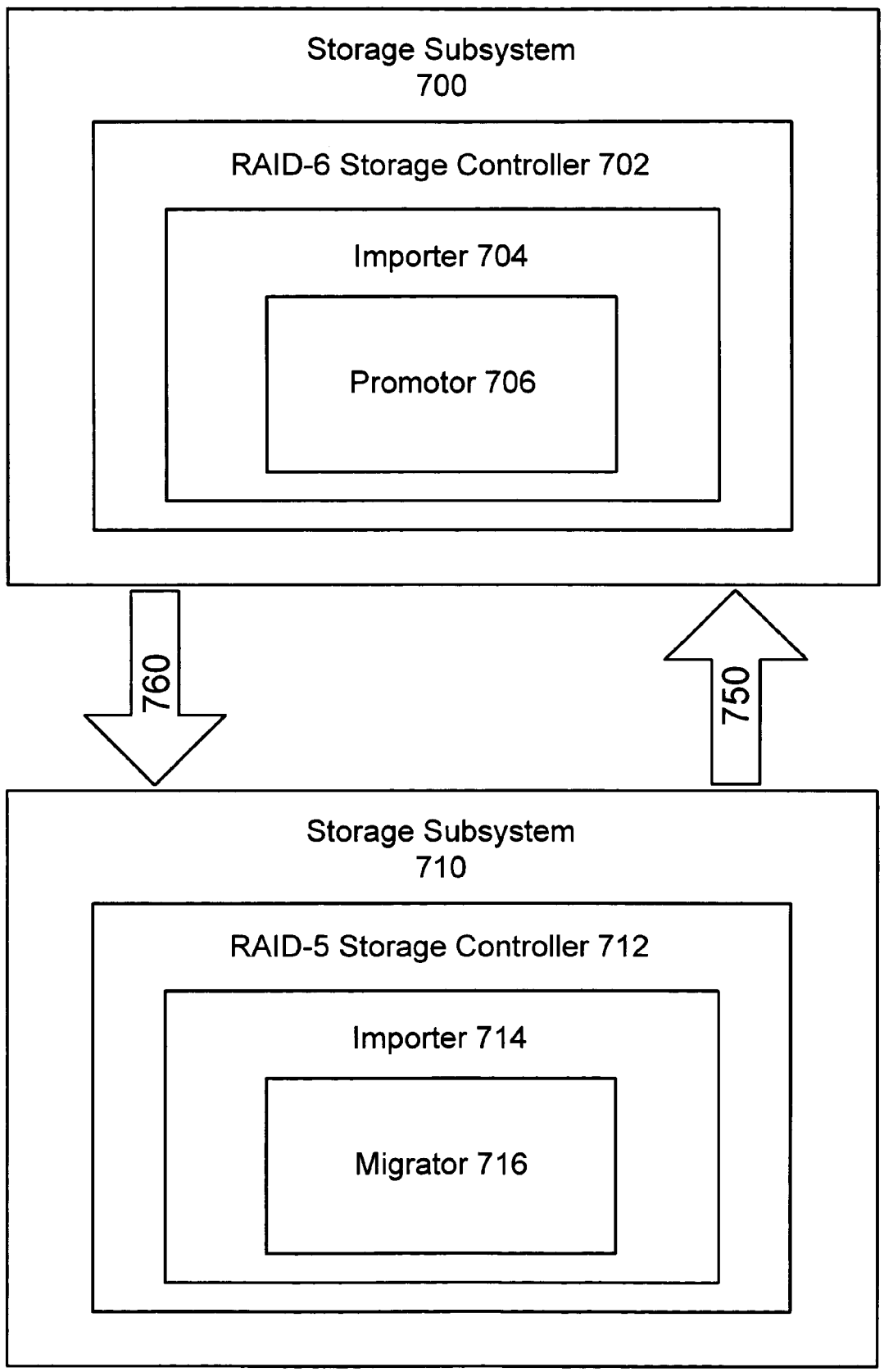
FIG. 7 is a diagram depicting an exemplary system for migrating a RAID level 6 logical volume for export and import between a RAID level 6 storage subsystem and a RAID level 5 storage subsystem in accordance with features and aspects hereof.

FIG. 7 is a block diagram showing a system including a first storage subsystem 700 having a RAID-6 storage controller 702. In response to an administrative user's request, RAID-6 storage controller 702 may prepare a logical volume managed thereby for export to another storage subsystem as indicated by arrow 760. The logical volume so prepared for exportation may then be physically removed (e.g., the disk drives or disk drive modules containing that logical volume, and potentially other logical volumes, may be physically removed and inserted into a second storage subsystem).

The system of FIG. 7 also includes a second storage subsystem 710 having a RAID-5 storage controller 712. As noted above, RAID-5 storage controller 712 may be adapted for appropriate RAID-5 storage management but it may be essentially incapable of adequately supporting RAID-6 storage management techniques. Storage controller 712 may include an importer element 714 adapted for importing logical volumes detected on inserted disk drives or disk drives modules. When importer 714 first detects insertion of one or more disk drives associated with imported logical volumes as indicated by arrow 760, importer 714 utilizes migrator 716 to migrate and re-map the RAID-6 storage logical volume to be utilized as a RAID-5 logical volume. Storage subsystem 710 may thereby utilize an imported RAID-6 logical volume by optimally managing it as standard a RAID-5 logical volume. The migrated, re-mapped logical volume over-writes the additional redundancy information blocks recorded on the disk drives by the first storage subsystem using RAID-6 management techniques.

Storage subsystem 710 may also prepare the imported logical volume for exportation to be forwarded to yet another storage subsystem (or to be returned to the original first storage subsystem 700 from which it was imported). As indicated by arrow 750, a logical volume managed as a RAID-5 logical volume by the second storage subsystems 710 may be exported to another storage subsystem adapted for effective support of RAID-6 storage management.

A RAID-6 storage subsystem (such as first storage subsystem 700) may import the logical volume exported by second storage subsystem 710. The RAID-5 logical volume may be flagged or tagged to indicate that the second storage subsystem 710 manipulated the logical volume as a RAID-5 logical volume though it was originally configured as a RAID-6 logical volume. Thus, storage subsystem 700 includes a RAID storage controller 702 that includes importer element 704 for importing such a flagged or tagged logical volume. Importer 704 recognizes that the flagged logical volume being imported was originally configured as a RAID-6 logical volume. Promoter element 706 then commences migrating of the volume from RAID level 5 format to a RAID level 6 volume by migrating data blocks, computing new first parity blocks, computing the additional redundancy information utilized by RAID-6 storage management techniques, and recording the new parity and additional redundancy blocks in a standard RAID level 6 storage management format.

Figure 8:
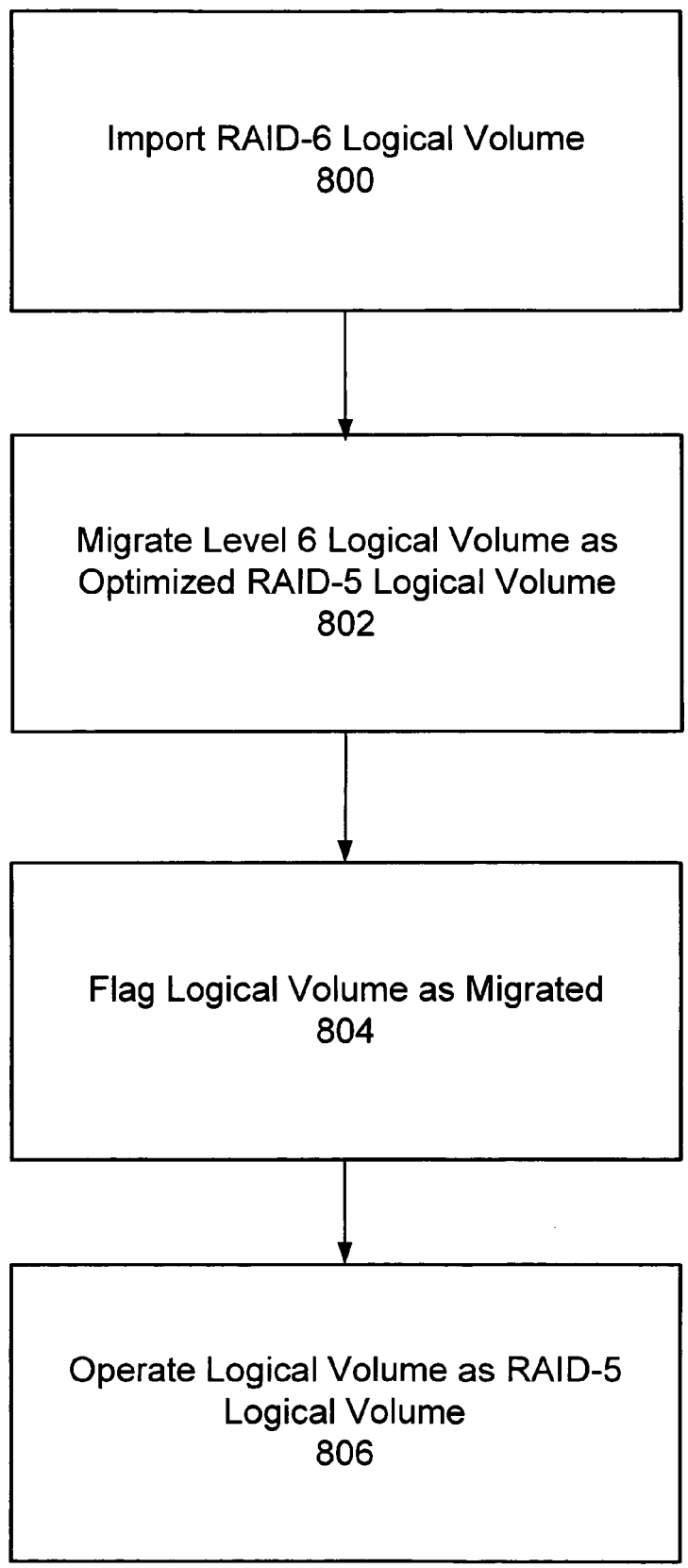
FIGS. 8 and 9 are flowcharts describing processes associated with migrating a RAID level 6 logical volume for export and import between a RAID level 6 storage subsystem and a RAID level 5 storage subsystem in accordance with features and aspects hereof.

FIG. 8 is a flowchart describing processing of a storage subsystem adapted to import a RAID-6 logical volume and to operate the imported volume as a RAID-5 logical volume. Element 800 is first operable to detect insertion of a new logical volume through insertion of one or more disk drives associated with the logical volume and to logically import one or more logical volumes associated with the inserted disk drives. In particular, element 800 is operable to detect and import a RAID-6 logical volume for utilization within this RAID-5 storage subsystem. Element 802 is then operable to migrate and re-map the logical volume to optimally utilize RAID-5 storage management techniques. As noted above, this migration and re-mapping of the imported RAID-6 logical volume migrates all data blocks, re-computes all RAID-5 parity blocks, and re-writes all stripes in accordance with optimal standard RAID level 5 formats.

Element 804 then flags the migrated, re-mapped logical volume to indicate that it has been migrated from RAID-6 format to RAID-5 format. Element 806 is operable to continue optimally operating the migrated, imported logical volume as a standard RAID-5 logical volume. The imported RAID-6 logical volume may thereby be utilized with desired optimal performance in a RAID-5 storage subsystem. By contrast to prior techniques, the imported logical volume is both available for use and utilized with optimal performance levels.

Those of ordinary skill in the art will recognize that temporary exclusion of access to a volume may be required as a volume is migrated as represented by processing of element 804. Techniques well known to those of ordinary skill in the art may be employed to lock the entire volume during the migration, to lock portions of the volume during related portions of the migration, or to lock individual stripes as the data in those stripes is migrated. Where less than the entire volume is locked for migration, portions where the migration is completed may be accessed by the controller using RAID-5 techniques and portions where the migration is not yet complete may either be deferred until after migration or may be performed using emulation of RAID-6 management in the RAID-5 storage controller (e.g., software implementation of RAID level 6 management devoid of hardware assist circuitry).

Figure 9:
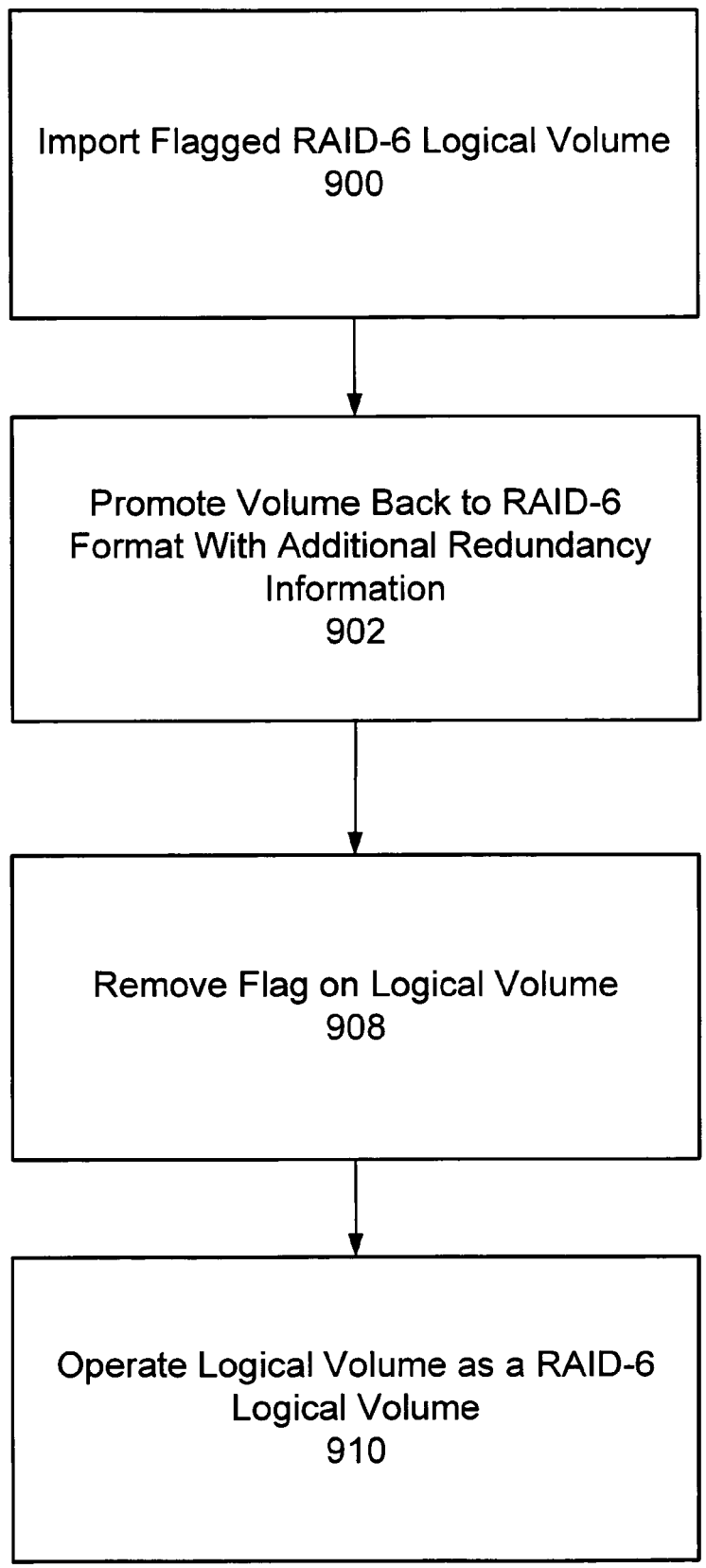

FIG. 9 is a flowchart describing a process in accordance with features and aspects hereof for importing a flagged logical volume into a RAID-6 storage subsystem. As noted above, a RAID-6 logical volume may be utilized in a RAID-5 storage subsystem in such a manner as to be flagged to indicate volume was migrated to RAID-5 format. Element 900 is therefore operable to detect and import such a flagged RAID-6 logical volume. Element 902 then performs rebuilding of the volume migrating from RAID-5 back to RAID-6 format. As noted above, this processing may include migrating (moving) data blocks to new stripe locations, computing RAID-5 first parity blocks, re-computing RAID-6 additional redundancy information, and writing the re-formatted stripes to new locations in the volume.

Upon completion of the promotion processing, element 908 is operable to remove or reset the flag on the logical volume to indicate that the logical volume is again restored to full RAID-6 operability. In particular, setting and resetting such a flag may be performed by altering the configuration information stored on each disk drive of the logical volume. Lastly, element 910 is operable to continue operations with the logical volume but now utilizing the logical volume as a full RAID-6 logical volume.

As above with respect to FIG. 8, temporary exclusive access to the volume may be required in conjunction with the promotion processing of element 902. Also as above, such locking may be for the entire volume, for portions of the volume, or for individual stripes of the volume such that some I/O request processing may continue in parallel with the promotion processing. Locking and cooperative I/O request processing techniques well know to those of ordinary skill in the art may be employed to effectuate such exclusive access and to permit continued processing of I/O requests in parallel with the promotion (migration) processing.

Still further, where a critical disk failure occurs during the migration (or promotion) processing of FIG. 8 or 9, a progress indicator indicating progress of the migration (promotion) processing may be queried to determine whether lost data may be recovered in accordance with RAID-5 or RAID-6 error recovery procedures. Where the lost data is in the RAID-5 portion of the data being processed, recovery relying on only RAID-5 parity may be employed to recover or regenerate lost data. Where the lost data resides in the RAID-6 portion of the data being processed, RAID-6 recovery may be used. If the storage controller that performs the recovery processing does not include RAID-6 hardware assist circuits but needs to recover data in a portion of the logical volume that is still in RAID-6 format, software processing may be employed within the storage controller to emulate the RAID-6 processing utilizing additional redundancy information.

Still further, those of ordinary skill in the art will recognize that the migration from RAID-6 to another RAID management level may include migration to levels in addition to level 5. For example, the logical volume to be imported may be migrated to RAID level 1 (mirrored data) or simply to RAID level 0 (striping without redundancy). When the RAID level 6 logical volume is to be imported to a second storage system that does not adequately support RAID-6, an administrative user may be prompted for the desired RAID level to which the volume must be imported to allow useful migrations of the volume thereto. A default answer may be provided or the volume may be left offline (unavailable) if no new RAID level is supplied by the administrative user.

Figure 10:
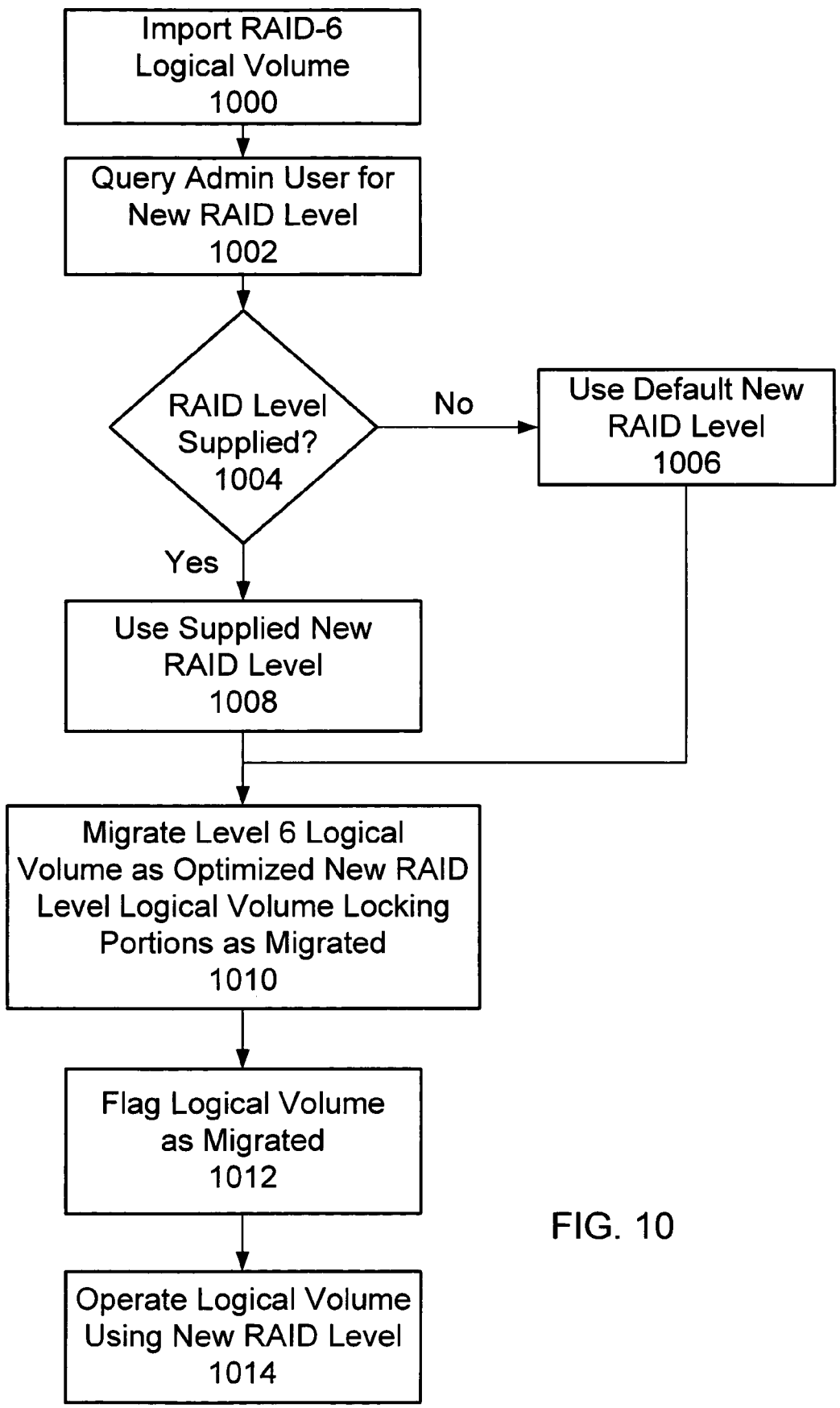
FIG. 10 is a flowchart describing a method in a broad aspect hereof in which an administrative user selects a new RAID level to which an imported RAID-6 volume is to be migrated prior to importation.

FIG. 10 is a flowchart broadly describing such a method in accordance with features and aspects hereof where a storage subsystem may prompt an administrative user for a new RAID management level to be used in conjunction with an imported logical volume. Element 1000 is first operable to import a logical volume as it is sensed in a new (second) storage subsystem. The storage subsystem recognizes the volume as a RAID level 6 logical volume that is not adequately supported by the storage subsystem (i.e., a subsystem devoid of hardware assist for level 6 redundancy information). Element 1002 is operable to query an administrative user to provide a desired new RAID level for use of the imported logical volume in this storage subsystem. If no new RAID level is supplied as determined by element 1004 (e.g., the administrative user query simply times out waiting for a response), then element 1006 provides a default new RAID level such as for example RAID level 5 with reduced redundancy or RAID level 0 striping with no redundancy). If the administrative user provides a new RAID level in response to the query, as in element 1008, the supplied new RAID level may be used for the imported logical volume.

Element 1010 uses the provided new RAID level (of element 1006 or 1008) and migrates the imported logical volume to the new RAID level. As noted above, the migration may consist of physical re-organization of the stripes and blocks of the stripes to form a new logical volume. In the alternative, the migration may be performed by re-mapping blocks without the need to regenerate any redundancy information.

Element 1012 flags the imported logical volume to indicate that it has been migrated from a first RAID level (e.g., level 6 as imported) to a new RAID level (e.g., RAID level 5 or RAID level 0). The flag may be stored with configuration information of the logical volume so that a first storage subsystem from which the volume was exported may realize that the original RAID level 6 logical volume may require restoration or rebuilding in some manner to return it to the earlier RAID level 6 format.

Lastly, element 1014 commences use of the newly imported, migrated logical volume using its new RAID logical volume format. The second storage subsystem may then use the logical volume until some later time when the volume may be exported and returned (by an importation and promotion process) to its earlier RAID level 6 format.

Those of ordinary skill in the art will readily recognize a variety of equivalent processes, methods, and techniques for effectively utilizing a RAID-6 logical volume in a storage subsystem essentially incapable of supporting RAID-6 but capable of supporting RAID-5 storage management techniques. The flowcharts of FIGS. 8, 9, and 10 are therefore intended merely as representative of exemplary methods and processes in accordance with features and aspects hereof to permit effective utilization of a RAID-6 logical volume as imported into a RAID-5 storage management system.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method associated with RAID storage subsystems including a first subsystem that includes hardware support for RAID level 6 storage management and including a second subsystem that includes hardware support for RAID level 5 storage management but does not include hardware support for RAID level 6 storage management, the method comprising:
    physically moving a RAID level 6 volume from the first subsystem to the second subsystem;
    migrating the RAID level 6 logical volume to a RAID level 5 configuration for use in the second subsystem wherein the migration is performed within the second subsystem wherein the logical volume remains accessible by the second subsystem to process I/O requests during the process of migration and wherein I/O requests relating to portions of the logical volume already migrated are processed using the RAID level 5 storage management hardware support of the second subsystem and wherein I/O requests relating to portions of the logical volume not yet migrated are processed by software emulation of RAID level 6 storage management within the second subsystem;
    operating the migrated logical volume in the second subsystem as a RAID level 5 logical volume following completion of migration; and
    flagging the migrated logical volume to indicate that the migrated logical volume has been migrated from a RAID level 6 logical volume to a RAID level 5 logical volume.

2. The method of claim 1 wherein the step of migrating the RAID level 6 logical volume to a RAID level 5 logical volume further comprises:
    moving blocks of data to form new RAID level 5 stripes on the disk drives of the logical volume; and
    regenerating parity blocks for each new RAID level 5 stripe so formed by the step of moving.

3. The method of claim 1 wherein the step of migrating the RAID level 6 logical volume to a RAID level 5 logical volume further comprises re-mapping the RAID level 6 to use the data blocks and first redundancy block of each RAID level 6 stripe of the RAID level 6 logical volume as a RAID 5 stripe to thus form the RAID level 5 logical volume.

4. The method of claim 1 further comprising:
    using RAID level 6 redundancy information during the step of migrating to recover from errors encountered during the step of migrating.

5. A system comprising:
    a first storage subsystem having hardware support for RAID level 6 management of a logical volume wherein the first storage subsystem includes a plurality of disk drives on which a RAID level 6 logical volume is configured wherein the first storage subsystem is adapted to export the RAID level 6 logical volume;
    a second storage subsystem having hardware support for RAID level 5 storage management but devoid of circuits to support RAID level 6 management and adapted to import the RAID level 6 logical volume; and
    migration apparatus associated with either or both of the first and second storage subsystems for migrating the RAID level 6 logical volume to a RAID level 5 configuration supported by circuits of the second storage subsystem,
    wherein the migration apparatus is adapted to allow continued processing of I/O requests within whichever storage subsystem performs the migration processing as the logical volume is being migrated,
    wherein I/O requests relating to portions of the logical volume already migrated are processed using hardware support of whichever storage subsystem performs the migration, and wherein, when the migration is performed by the second storage subsystem, I/O requests relating to portions of the logical volume not yet migrated are processed by software emulation of RAID level 6 storage management within the second storage subsystem.

6. The system of claim 5 wherein the migration apparatus is further adapted to relocate data blocks of stripes of the RAID level 6 logical volume to form new stripes that comprise the RAID level 5 logical volume and to generate corresponding parity blocks for the new stripes.

7. The system of claim 5 wherein the migration apparatus is further adapted to re-map data blocks and a corresponding parity block of each stripe of the RAID level 6 logical volume to form corresponding new stripes of a RAID level 5 logical volume.

8. In a system including a first storage subsystem and a second storage subsystem, a method for exporting and importing a RAID logical volume between the first and second storage subsystems, the method comprising:

exporting a RAID level 6 logical volume from the first storage subsystem;

migrating the RAID level 6 logical volume into a RAID level 5 logical volume;

physically moving the logical volume from the first storage subsystem to the second storage subsystem wherein the step of physically moving is performed either before the step of migrating or after the step of migrating; and importing the RAID level 5 logical volume into the second storage subsystem wherein the second storage subsystem includes circuits to support RAID level 5 storage management.

9. The method of claim 8 wherein the step of migrating is performed within the first storage subsystem in response to the step of exporting and prior to the step of physically moving.

10. The method of claim 8 wherein the step of migrating is performed within the second storage subsystem in advance of the step of importing and following the step of physically moving.

11. The method of claim 8 wherein the step of migrating further comprises:

relocating data blocks of stripes of the RAID level 6 logical volume to form new stripes that comprise the RAID level 5 logical volume and to generate corresponding parity blocks for the new stripes.

12. The method of claim 8 wherein the step of migrating further comprises:

re-mapping data blocks and a corresponding parity block of each stripe of the RAID level 6 logical volume to form corresponding new stripes of a RAID level 5 logical volume.

* * * * *